(12) United States Patent
Tehrani et al.

(10) Patent No.: US 12,518,077 B1
(45) Date of Patent: Jan. 6, 2026

(54) SIMULTANEOUS MULTI-SCENARIO STATIC NOISE ANALYSIS

(71) Applicant: Synopsys, Inc., Mountain View, CA (US)

(72) Inventors: Peivand Tehrani, Campbell, CA (US); Paul Berevoescu, Sunnyvale, CA (US); Shaun Koruthu Peter, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 614 days.

(21) Appl. No.: 18/075,292

(22) Filed: Dec. 5, 2022

(51) Int. Cl.
  *G06F 30/30* (2020.01)
  *G06F 30/367* (2020.01)

(52) U.S. Cl.
  CPC .................. *G06F 30/367* (2020.01)

(58) Field of Classification Search
  CPC ...................................................... G06F 30/367
  See application file for complete search history.

(56) References Cited

U.S. PATENT DOCUMENTS

| | | | |
|---|---|---|---|
| 6,615,395 B1 * | 9/2003 | Hathaway | G06F 30/3312 716/113 |
| 8,495,544 B2 * | 7/2013 | Celik | G06F 30/3312 716/113 |
| 11,709,983 B1 * | 7/2023 | Shen | G06F 30/367 716/113 |
| 2004/0098677 A1 * | 5/2004 | Guo | G06F 30/367 716/115 |

* cited by examiner

*Primary Examiner* — Jack Chiang
*Assistant Examiner* — Brandon Bowers
(74) *Attorney, Agent, or Firm* — Lowenstein Sandler LLP (57) ABSTRACT

A computer-implemented method for performing static noise analysis in an electronic design of an integrated circuit includes accessing, by a processing device, the electronic design including a plurality of voltage domains, wherein each voltage domain includes one or more functional elements and one or more domain voltages. The method further includes performing a timing analysis of the electronic design and determining respective signal arrival timing windows for the one or more functional elements in the electronic design. The method further includes generating a noise waveform at a first functional element based on the signal arrival timing windows and slews of aggressor nets of a first functional element in a first voltage domain of the plurality of voltage domains. The method further includes determining a number of noise waveforms reaching a second functional element in a second voltage domain based on the plurality of voltage domains and the one or more domain voltages in the plurality of voltage domains, and propagating at least one noise waveform of the number of noise waveforms to the second functional element.

20 Claims, 7 Drawing Sheets

SIMULTANEOUS MULTI-SCENARIO STATIC NOISE ANALYSIS

TECHNICAL FIELD

The present disclosure relates to electronic design automation. More specifically, embodiments disclosed herein relate to tools for performing noise analysis in electronic circuit designs.

BACKGROUND

Noise in integrated circuits can lead to functional failure of a circuit. Static analysis of noise in a circuit is a technique that analyzes the design of the integrated circuit (IC). ICs may have many voltage domains that could operate at different voltage values. This method of analysis is achieved by breaking each design into a set of subcircuits in such a way that the entire design is represented by a graph where the nodes of the graph represent the subcircuits, and the edges of the graph represent the nets or wire connections between the subcircuits. The graph is sorted, similar to levelization in static timing analysis, so that when any node is analyzed, all preceding circuits that could affect this node's inputs have previously been analyzed. Each subcircuit is analyzed completely in the presence of a variety of noise sources, with the results of the subcircuit simulations propagated to successor circuits in the larger design, using the sorted graph.

Analysis of each subcircuit for noise requires individual simulations of the subcircuit in the presence of various noise sources, to properly characterize the circuit's response to capacitive coupling injected noise, different power supply values, and propagated noise or noise coming from a preceding circuit to the inputs of the subcircuit. Static noise analysis can also be extended to include a sensitivity analysis of the circuit, to characterize how the circuit may respond to the input noise and to understand how the output voltage of a circuit changes with respect to the input voltage changes caused by noise. Consequently, performing static analysis of noise in an IC may be a time consuming and memory intensive process.

SUMMARY

One embodiment is a computer-implemented method for performing noise analysis in an electronic design of an integrated circuit. The method includes accessing, by a processing device, the electronic design including a plurality of voltage domains, wherein each voltage domain includes one or more functional elements and one or more domain voltages. The method further includes performing a timing analysis of the electronic design and determining respective signal arrival timing windows for the one or more functional elements in the electronic design. The method further includes generating a noise waveform at a first functional element based on the signal arrival timing windows and slews of aggressor nets of a first functional element in a first voltage domain of the plurality of voltage domains. The method further includes determining a number of noise waveforms reaching a second functional element in a second voltage domain based on the plurality of voltage domains and the one or more domain voltages in the plurality of voltage domains, and propagating at least one noise waveform of the number of noise waveforms to the second functional element.

Another embodiment is a non-transitory computer-readable medium storing program instructions executable by a processing device, causing the processing device to perform operations including accessing an electronic design of an integrated circuit, the electronic design including a plurality of voltage domains, wherein each voltage domain includes one or more functional elements and one or more domain voltages. The instructions further cause performing a timing analysis of the electronic design and determining respective signal arrival timing windows for the one or more functional elements in the electronic design the instructions further cause generating a noise waveform at a first functional element based on the signal arrival timing windows and slews of aggressor nets of a first functional element in a first voltage domain of the plurality of voltage domains. The instructions further cause determining a number of noise waveforms reaching a second functional element in a second voltage domain based on the plurality of voltage domains and the one or more domain voltages in the plurality of voltage domains, and propagating at least one noise waveform of the number of noise waveforms to the second functional element.

Another embodiment is a system for performing noise analysis in an electronic design of an integrated circuit. The system includes a processing device and a memory coupled to the processing device, the memory storing computer readable instructions that when executed by the processing device cause the processing device to perform operations including accessing the electronic design of the integrated circuit, the electronic design including a plurality of voltage domains, wherein each voltage domain includes one or more functional elements and one or more domain voltages. The instructions further cause performing a timing analysis of the electronic design and determining respective signal arrival timing windows for the one or more functional elements in the electronic design. The instructions further cause generating a noise waveform at a first functional element based on the signal arrival timing windows and slews of aggressor nets of a first functional element in a first voltage domain of the plurality of voltage domains. The instructions further cause determining a number of noise waveforms reaching a second functional element in a second voltage domain based on the plurality of voltage domains and the one or more domain voltages in the plurality of voltage domains, and propagating at least one noise waveform of the number of noise waveforms to the second functional element.

BRIEF DESCRIPTION OF THE DRAWINGS

The disclosure may be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

With increase in the density of integrated circuit (IC) components on every chip, the number of static noise analysis (SNA) signoff scenarios, including multiple voltage domains, multiple frequency domains, and multiple technology corners, has also exponentially increased. As a result, significant resources including more machines, memory, and runtime are required to enumerate, analyze, and fix each scenario individually. Identifying the noise violations in each scenario and fixing them could lead to over-fixing, which could impact power, performance, and area (PPA) of the IC.

There are two components to static noise analysis (SNA). Injected noise is generated when an aggressor net (e.g., source of a noise) switches and it creates a noise onto a victim net (e.g., a component impacted by the noise). As a secondary effect, these injected noises propagate to the following stages, get combined with injected noise on mentioned stages, and eventually reach an endpoint, which may include a data register or a flip flop, for example. If the noise is large enough to cause a functional failure of a data register or flip flop, the noise is marked as an endpoint violation. If a sizable functional noise occurs at the input of a data register when the data register is active, the wrong logic value could be stored in the data register. Therefore, static noise analysis should keep track of the maximum noise value for every net in the design. In other situations, if the propagated noise becomes large enough that it could be compared to a full rail transition, then these occurrences are identified as "catastrophic failures" and the associated endpoints are marked as catastrophic failures during simulation.

One of the objectives of performing SNA is to find sources of these violations and let a user know about them so the user can fix the noise using a multitude of strategies including, but not limited to, inserting a buffer, reducing the coupling capacitance, reducing the victim net size, or making the aggressor net less aggressive by reducing its size, for example. IC designs could operate in multiple scenarios and one of the most common scenarios is the presence of multiple voltage domains, with each of the domains having different voltage values. Performing SNA on such multiple voltage domains increases the number of scenarios to be analyzed exponentially, and running the simulation on the entire design can be both time consuming and memory intensive.

Accordingly, one aspect of the present disclosure includes a system and method for performing SNA for multiple domains and multiple voltage scenarios in a single run. In a first operation, the method involves generating a cell level description of the electronic circuit (e.g., Verilog). In a second step, the method involves determining a characterized timing and noise behavior of each of the cells (e.g., Liberty library data). In a third step, the method involves determining the net parasitics of the electronic circuit (e.g., using standard parasitic exchange format (SPEF) data including resistors, capacitors, and coupling capacitors between nets).

Upon receiving these inputs, the method then involves creating a noise and timing graph with cells as nodes and nets as edges. Each cell has input and output pins, and these pins are connected to the corresponding input and output nets. The noise and timing graph is then levelized from the primary inputs (e.g., input ports and register Dpins) to outputs (e.g., output ports and register Qpins). In the next step, the method involves performing a timing analysis, which provides aggressor nets signal arrival time windows and slews that are to be used in the noise analysis.

In the next step, the method involves performing the gate level noise analysis, which starts from the primary inputs. Depending on the involved voltage domains, and voltage levels in each domain, the method involves determining the number of noise computations required for that stage. Each computation can have its own unique voltage configuration. Each computation can have its own relevant matching aggressor voltage configuration. After the computations are completed, data from the analysis is annotated and the flow proceeds to the next level. At the next level, the relevant data from previous stages are pre-loaded as inputs and expanded or merged depending on the needed voltage configurations. This operation is repeated for every stage of the design in a levelized fashion.

Some of the computations may point to large computed noise (e.g., catastrophic failures). These stages are marked and the propagating noise is reset from them. In one embodiment, the resetting operation could be done per voltage configuration or if a single voltage configuration fails, all configurations could be reset.

After propagating all noises to the endpoints, each endpoint is evaluated for failure for each voltage configuration. In the next step, a back trace in the noise and timing graph is performed, which identifies the first source (nearest to start-point) as the source of the failure. A user may then use engineering change order (ECO) techniques discussed above to fix the sources as well as catastrophic failures for all voltage configurations.

One advantage of the disclosed method is that all failure points are available concurrently, and the fixes can be implemented and tested together. Other advantages of the present disclosure include, but are not limited to significant runtime memory improvement compared to single-scenario static noise analysis. The user is able to perform simultaneous analysis of noise violations across multiple scenarios in a single run. The methods and systems disclosed shorten the noise engineering change order (ECO) turnaround time (TAT) and improve the power, performance, and area (PPA) of the chip due to enhanced visibility and controllability of noise endpoint selection. The simultaneous multi-scenario static noise analysis disclosed herein can be extended to include multiple technology corners, multiple temperatures, and multi-die paradigms. Additionally, the simultaneous multi-scenario static noise analysis disclosed is able to analyze multiple scenarios in a single run and provide reporting capabilities with a consolidated view across all scenarios. The methods disclosed provide a flexible and smart mechanism to propagate and merge noise scenarios to reduce runtime and memory usage while matching quality of results (QoR) against single scenarios runs. The methods disclosed provide concurrent reports for all scenarios analyzed and guarantee that noise violations across all the scenarios are detected and reported in a single run. The present disclosure has the advantages where all the scenarios are analyzed in a single run and there is significant savings on the run time and the memory used to perform the static noise analysis.

Figure 1:
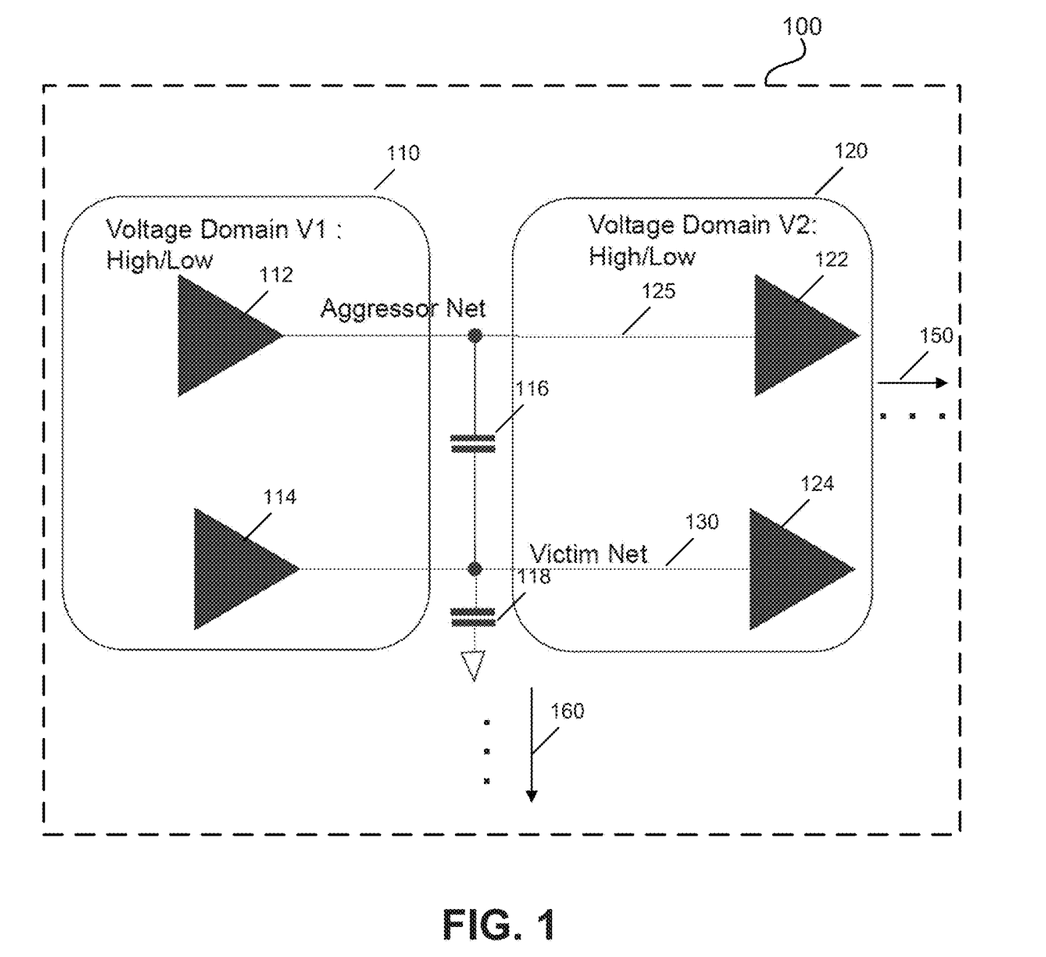
FIG. 1 illustrates a schematic of victim and aggressor stages with their corresponding voltage domains. A stage includes a cell driver, a cell receiver, and a net connecting the cell driver and the cell receiver, in accordance with an embodiment of the present disclosure.

Turning now to FIG. 1, illustrated is an example implementation of victim and aggressor stages of electronic circuit 100, according to some embodiments of the present disclosure. The electronic circuit 100 may include a number of stages, each stage including a cell driver, a cell receiver, and a net physically connecting the cell driver and the cell receiver. The electronic circuit 100 may be that of a system-on-chip (SoC) and/or an IP module. The SoC may include different IC components which are often referred to as IP modules. Examples of IP modules include processors (e.g., microprocessor, microcontroller, digital signal processor, video processor, audio processor, specialized co-processors, etc.) or components or functions of processors, memories and memory management unit (including cache, flash controllers, content addressable memory, or other types of dedicated data storage), and input/output and communication components (e.g., USB, PCIE, I2C, SATA, wireless, Ethernet, peripherals drivers, etc.).

Voltage domain 110 may include one or more functional elements 112, 114 (e.g., IC components) such as a cell driver, a cell receiver, a flip flop, a register, a storage element, an IP module, a logic gate, an AND gate, an OR gate, a NOR gate, a multiplexer, a transistor, or combinations thereof. Similarly, voltage domain 120 may include one or more functional elements 122, 124 (e.g., IC components) such as a cell driver, a cell receiver, a flip flop, a register, a storage element, an IP module, a logic gate, an AND gate, an OR gate, a NOR gate, a multiplexer, a transistor, or combinations thereof. Each domain 110, 120 may operate at multiple voltages (e.g., 0.1 v to 2.0 v or greater). For example, IC components in domains 110, 120 may operate at voltages 0.5 v, 0.7 v, and 0.9 v. Similarly, each domain 110, 120 may operate at multiple clock frequencies (e.g. 0.1 GHz to 2.0 GHz or greater). For example, IC components in domains 110, 120 may operate with 0.8 GHz, 1.5 GHZ, and 2.0 GHz clocks. It should be noted, however, that voltage domains are a function of the way devices are connected to the voltage rails, and frequency domains are a function of the way devices are connected together (e.g., via data or clock paths). In one embodiment, the voltage domains 110, 120 may be differentiated by different supplies connected to, for example, different voltage islands. The electronic circuit 100 may include additional stages in additional voltage domains, which may be arranged downstream from voltage domains 110, 120, as indicated by arrows 150 and 160. In the example shown in FIG. 1, the line connecting functional elements 112 and 122 may be referred to as an aggressor net 125 (e.g., source of a noise) and the line connecting functional elements 114 and 124 may be referred to as a victim net 130 (e.g., a component impacted by the noise), which will be described in further detail with respect to FIG. 2.

At the physical level a "voltage domain" may include a set of (regular) physical gates with one or more voltages and a single ground rail connecting to the same pair of voltage and ground nets. The nets are driven by the physical gates. The voltage domain may also include a set of special gates such as level shifter cells, state retention cells, isolation cells, voltage switches, always-on cells, or multi-rail hard macros (e.g., I/Os, memories, etc.) with multiple voltage and ground rails. At least one pair of the voltage or ground rails in these special gates or macros may be connecting to the same pair of voltage and ground nets as the (regular) physical gates connect to. At the logic level a voltage domain may include a set of logic gates that correspond to the (regular) physical gates of this voltage domain. The nets are driven by these logic gates. The voltage domain may also include a set of special gates such as level shifter cells, state retention cells, isolation cells, voltage switches, always-on cells, or multi-rail hard macros (e.g., I/Os, memories, etc.) that correspond to the physical implementation of these gates in this voltage domain. At register transfer level (RTL), a voltage domain may include the computational elements (e.g., operators, process, function, and conditional statements) that correspond to the logic gates in this voltage domain, and the signals that correspond to the nets driven by the corresponding logic gates.

With multi voltage designs, there is the complication of designing in separate voltage islands where voltage crossings between islands may require "Level Shifter" (LS) cells with the need to implement and analyze the blocks at their different voltage characteristics.

Figure 2:
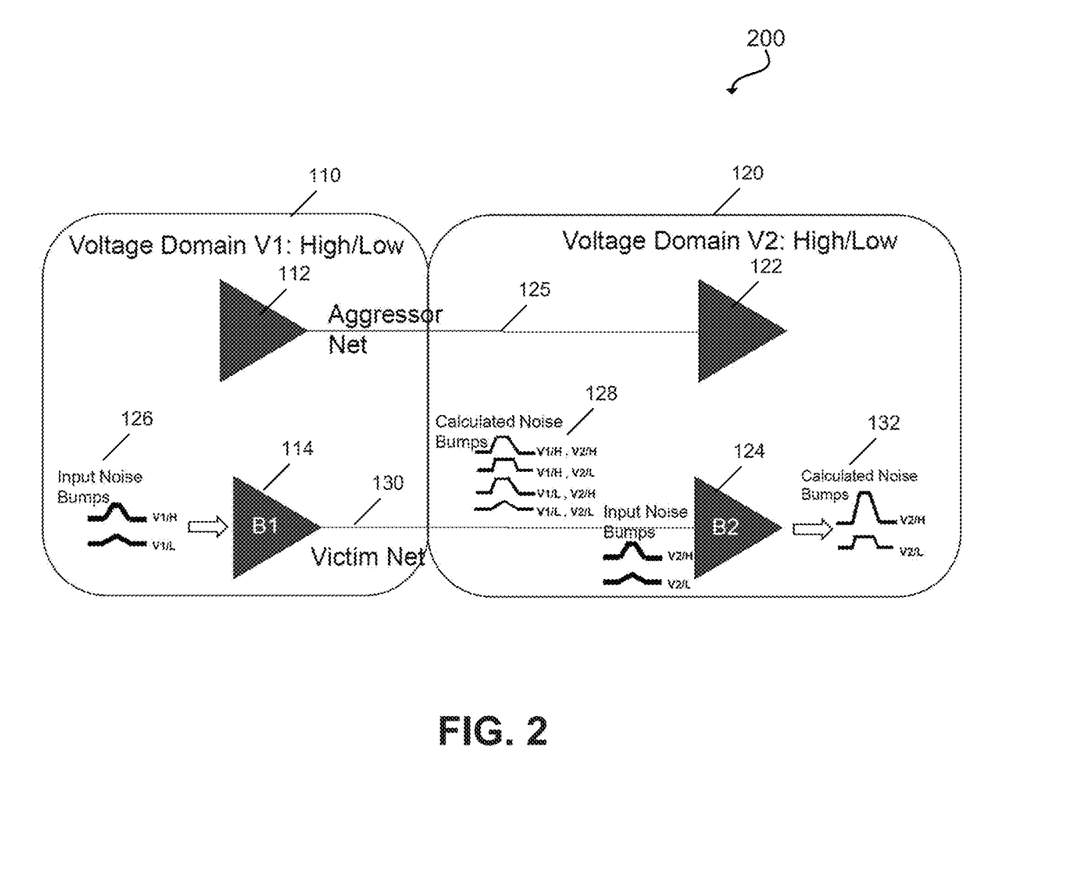
FIG. 2 illustrates an example system for performing noise analysis in a stage of an electronic design of an integrated circuit, in accordance with an embodiment of the present disclosure.

FIG. 2 illustrates an example system 200 for performing noise analysis in an electronic design of an integrated circuit 100 shown in FIG. 1. In this example, the line connecting functional elements 112 and 122 may be referred to as an aggressor net 125 (e.g., source of a noise) and the line connecting functional elements 114 and 124 may be referred to as a victim net 130 (e.g., a component impacted by the noise) such that when the aggressor net 125 switches, it creates a noise onto the victim net 130. In this example, since voltage domain 110 operates at two voltages (e.g., a high and a low), any noise from a previous stage would propagate as two waveforms 126 (e.g., noise bumps) at the input of functional element 114. Additionally, since adjacent voltage domain 120 is also operating at two voltages (e.g., a high and a low), the output noise at functional element 114 multiplies into four different waveforms 128 (e.g., noise bumps). In one example, if M is the number of voltages in one domain and N is the number of voltages in the adjacent domain, then the number of noise waveforms or bumps enumerated would be M×N. In some embodiments, the source of the noise may or may not be in the same domain, and the noise may travel across domains and propagate into a larger noise down the circuit.

In the example shown in FIG. 2, the victim and aggressor nets 130, 125 cross between two voltage domains V1 and V2, and each domain has two voltage levels (e.g., a high and a low). Accordingly, there may be four noise computations performed for the victim net 130, namely V1 (low)-V2 (low), V1 (low)-V2 (high), V1 (high)-V2 (low), and V1 (high)-V2 (high). For each computation, only the aggressor information that is compatible with the current victim scenario may be used. Separate noise calculations may be performed for all voltage domain levels for within-domain nets, and separate noise calculations may be performed for all cross-domain voltage level combinations at drivers of domain crossing nets. In the example shown in FIG. 2, these calculations would be performed for functional elements 112 and 114.

At the input of functional element 124, only two of the four waveforms 128 may be selected to propagate through functional element 124. Therefore, the calculated noise bumps 132 at the output of functional element 124 may only include two waveforms (e.g., V2/H and V2/L). Alternatively, all of the four waveforms 128 may be selected to propagate through functional element 124. The process of selecting fewer than the maximum number of voltage noise bumps available may be referred to herein as "merging." Similarly, the process of selecting more than the maximum number of voltage noise bumps available at any given point the design may be referred to as "expanding." Input noise waveforms at B1 are expanded to enumerate all cross-domain voltage level combinations (e.g., V1 (low)-V2 (low), V1 (low)-V2 (high), V1 (high)-V2 (low), and V1 (high)-V2 (high)), and input noise waveforms at B2 are worst-cased (merged) based on compatibility within-domain voltage level (e.g., V2/H and V2/L). In some embodiments, merging of the input noise waveforms can be postponed by predefined number of logic levels to improve accuracy.

Figure 3:
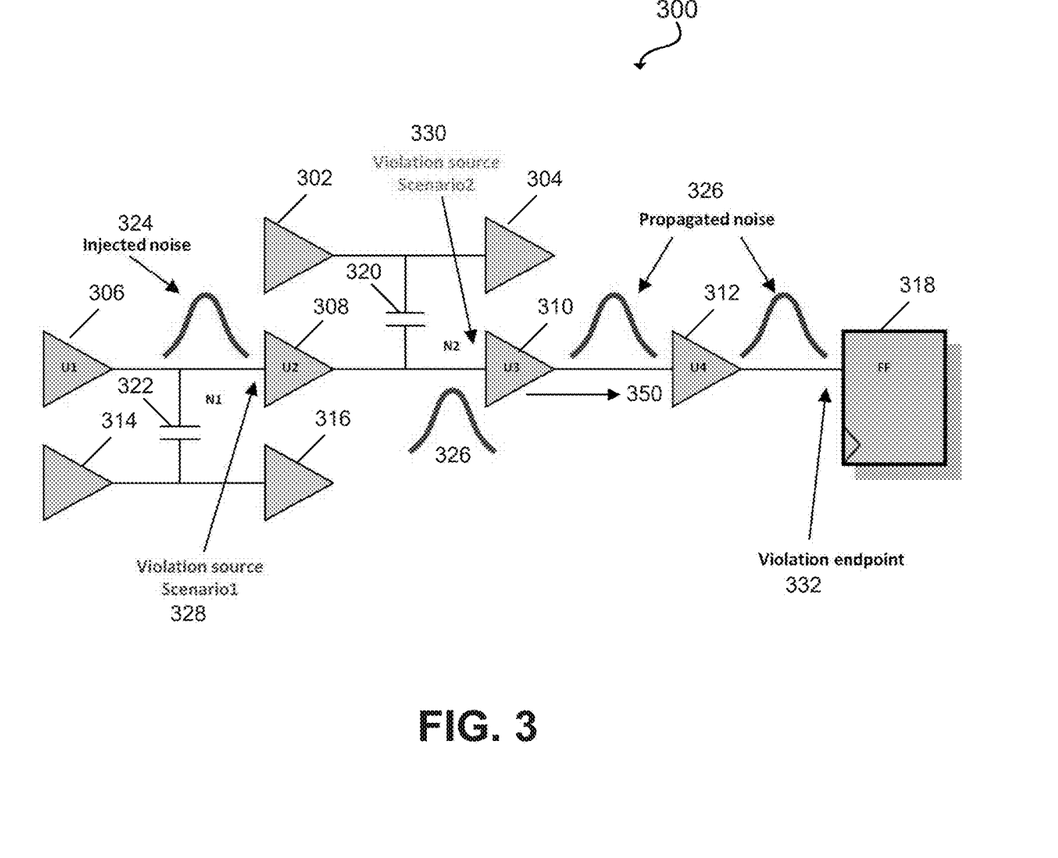
FIG. 3 illustrates an example system for performing noise analysis in an electronic design of an integrated circuit, in accordance with an embodiment of the present disclosure.

FIG. 3 illustrates another example system 300 for performing noise analysis in an electronic design of an integrated circuit, in accordance with an embodiment of the present disclosure. The system 300 may include functional elements 302-318, which may be coupled via coupling capacitors 320, 322, and the like. Functional elements 302-318 (e.g., IC components) may include a cell driver, a cell receiver, a flip flop, a register, a storage element, an IP module, a logic gate, an AND gate, an OR gate, a NOR gate, a multiplexer, a transistor, or combinations thereof. System 300 describes two voltage level scenarios. In first voltage scenario, a large injected noise waveform 324 is detected at input of functional element 308 due to switching of aggressor element 314. Input of 308 is marked as a violation source for the first scenario 328. This noise waveform would propagate through IC component 308 and get combined with the injected noise from switching of aggressor 302. Furthermore, this noise waveform propagates through IC components 310 and 312, and reaches a violating endpoint (e.g., a register or flip flop) 318. In second voltage scenario, the noise waveform does not create a noise failure at the input of IC component 308. Instead, when it propagates and gets combined with the injected noise from aggressor 302 in form of noise waveform 326, a noise violation source 330 is detected and marked at the input of IC element 310. Furthermore, this noise waveform propagates through IC components 310 and 312, and reaches a violating endpoint (e.g., a register or flip flop) 318. Although the flow is described as scenario by scenario, in system 300 these scenarios are analyzed and propagated concurrently in a stage by stage manner.

In addition, if there are multiple voltage domains in the system and the electrical noise signal goes from one domain to another adjacent domain, the system may be able to "merge" two or more noise waveforms into a lesser number at any point in the design. Similarly, the system may be able to "expand" the number of noise waveforms, thereby increasing the number of waveforms at any point in the design. In one example, the system may be able to merge the noise waveforms at one functional element within a voltage domain and expand the noise waveforms at another functional element within a second voltage domain, which may be further downstream in the circuit from the first voltage domain. Conversely, the system may be able to expand the noise waveforms at one functional element within a voltage domain and merge the noise waveforms at another functional element within a second voltage domain, which may be further downstream in the circuit from the first voltage domain.

In one embodiment, the system may be able to determine a height, area, and shape of the propagated noise bump 326 (e.g., waveform) at the functional element 318. Similarly, the system may be able to perform a noise immunity evaluation and determine an endpoint violation by propagating the incoming noise waveform 326 to the functional element 318 through its first channel-connected block (CCB), and comparing the height of that noise waveform at the output of the CCB against a predefined criterion (e.g., a threshold height).

Each integrated circuit may have an acceptable noise limit and some ICs may have more noise limits than other ICs, and similarly some ICs may have lower noise limits than other ICs. The system may also report the violation and include information about the violation source, for example, a location of the violation within the electronic design, for the user to review the violation and fix the noise. In some embodiments, the system may also report the height and/or area of the noise under the waveform, a source of the noise, and timing of the noise relative to the source. In fixing such a violation, the user may fix the noise issue either at source 328 or at source 330. Fixing the noise issue may involve many methodologies including but not limited to inserting a buffer, eliminating a parasitic, moving a first functional element farther from a second functional element, reducing a coupling capacitance, reducing a size of an aggressor functional element, reducing a size of the victim functional element, or rewiring part or the entire voltage domain(s). In some embodiments, the propagated noise may be reset at the source in case of catastrophic failure and the user may be notified so they can fix the noise issue. Catastrophic failure happens when the noise waveform height becomes comparable with voltage swing of the IC component. Using the methods disclosed above the user may be able to fix each standalone scenario individually or fix them concurrently. Concurrent noise fixing methodology avoids over-fixing hence improves the design power consumption, performance, and area (PPA).

Accordingly, the methods disclosed above may use an on-demand "vectorization" infrastructure, including the number of domains and the number of voltages/frequencies within each domain, to compute crosstalk noise at each victim net and propagate the noise. In some embodiments, one noise computation may be performed for every voltage level combination (scenario) of the victim net. One aspect of the disclosed method is that while all cross-domain scenarios are enumerated, only the within-domain scenarios may be maintained and propagated.

Figure 4:
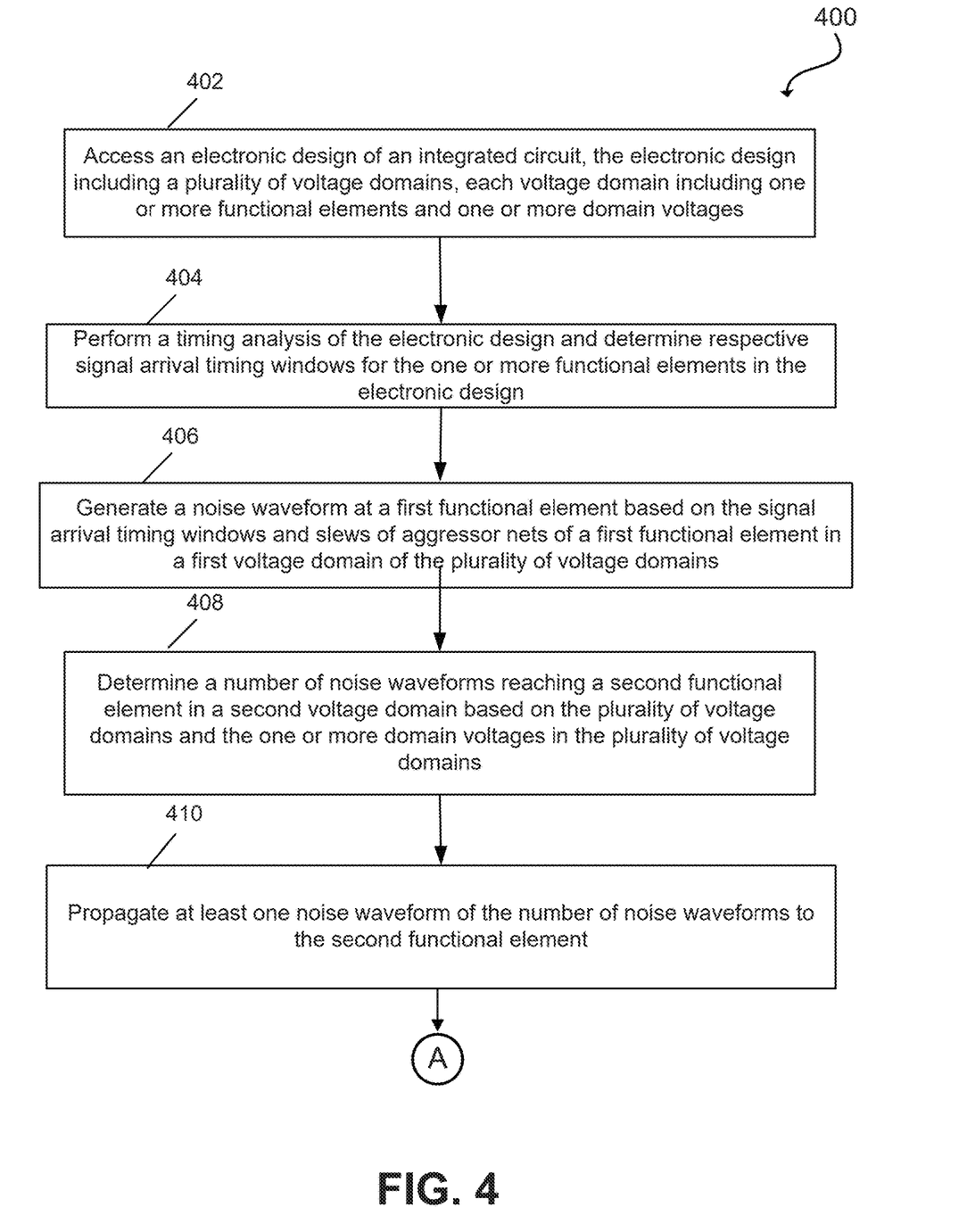
FIG. 4 illustrates example operations in a computer-implemented method for performing noise analysis in an electronic design of an integrated circuit, in accordance with an embodiment of the present disclosure.

FIG. 4 illustrates example operations in a computer-implemented method 400 for performing noise analysis in an electronic design of an integrated circuit, in accordance with an embodiment of the present disclosure. At operation 402, the processing logic may access the electronic design of the integrated circuit, which may include one or more voltage domains, such as voltage domains 110 and 120, including one or more functional elements, such as 112, 114, 122, 124. The electronic design may be stored locally (e.g., on a memory device) or may be accessed on a remote computer, via a wired or wireless network. In one embodiment, the electronic design may include functional elements, which may be coupled via coupling resistances, grounded capacitances, resistances, and the like. Functional elements (e.g., IC components) may include a cell driver, a cell receiver, a flip flop, a register, a storage element, an IP module, a logic gate, an AND gate, an OR gate, a NOR gate, a multiplexer, a transistor, or combinations thereof. In a first operation, the method involves generating a cell level description of the electronic circuit (e.g., Verilog). In a second step, the method involves determining a characterized timing and noise behavior of each of the cells (e.g., Liberty library data). In a third step, the method involves determining the net parasitics of the electronic circuit (e.g., using standard parasitic exchange format (SPEF) data including resistors, capacitors, and coupling capacitors between nets).

Upon receiving these inputs, the method then involves creating a noise and timing graph with cells as nodes and nets as edges. Each cells has input and output pins, and these pins are connected to the corresponding input and output nets. The noise and timing graph is then levelized from the primary inputs (e.g., input ports and register Dpins) to outputs (e.g., output ports and register Qpins). In the next step, the method involves performing a timing analysis, which provides aggressor nets signal arrival time windows and slews that are to be used in the noise analysis.

In the next step, the method involves performing the gate level noise analysis, which starts from the primary inputs. Depending on the involved voltage domains, and voltage levels in each domain, the method involves determining the number of noise computations required for that stage. Each computation can have its own unique voltage configuration. Each computation can have its own relevant matching aggressor voltage configuration. After the computations are completed, data from the analysis is annotated and the flow proceeds to the next level. At the next level, the relevant data from previous stages are pre-loaded as inputs and expanded or merged depending on the needed voltage configuration. This operation is repeated for every stage of the design in a levelized fashion.

Some of the computations may point to large computed noise (e.g., catastrophic failures). These stages are marked and the propagating noise is reset from them. In one embodiment, the resetting operation could be done per voltage configuration or if a single voltage configuration fails, all configurations could be reset.

After propagating all noises to the endpoints, each endpoint is evaluated for failure for each voltage configuration. In the next step, a back trace in the noise and timing graph is performed, which identifies the first source (nearest to start-point) as the source of the failure. A user may then use engineering change order (ECO) techniques discussed above to fix the sources as well as catastrophic failures for all voltage configurations. Accordingly, at operation 404, the processing logic may perform a timing analysis of the electronic design and determining a respective signal aggressor nets arrival timing window and slews for the one or more functional elements in the electronic design.

At operation 406, the processing logic may generate a noise waveform at a first functional element in a first voltage domain of the plurality of voltage domains. At operation 408, the processing logic may determine a number of noise waveforms reaching a second functional element in a second voltage domain based on the plurality of voltage domains and the one or more domain voltages in the plurality of voltage domains. At operation 410, the processing logic may propagate at least one noise waveform of the number of noise waveforms to the second functional element.

Figure 5:
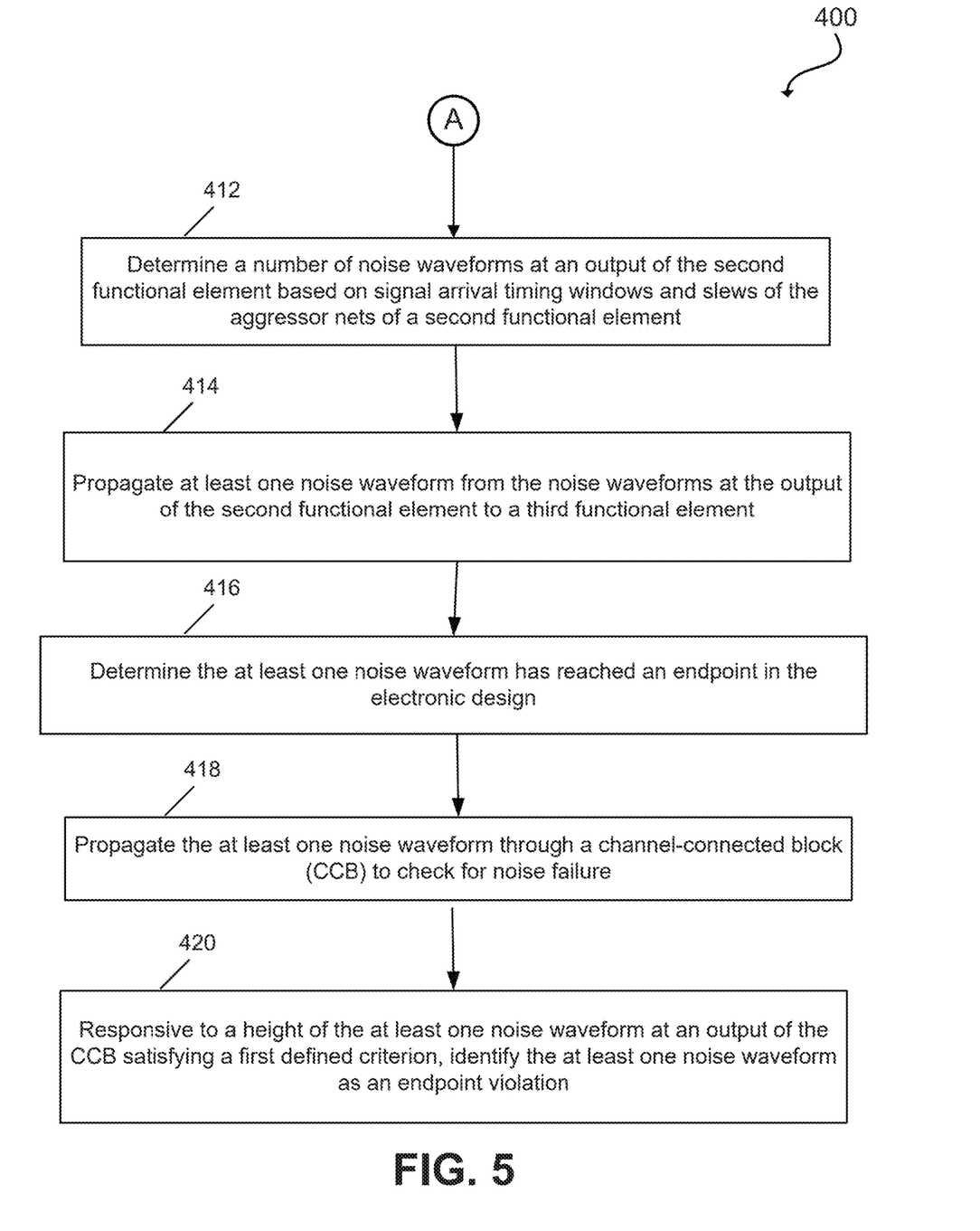
FIG. 5 illustrates additional operations in the computer-implemented method for performing noise analysis in an electronic design of an integrated circuit, in accordance with an embodiment of the present disclosure.

FIG. 5 illustrates additional operations in the computer-implemented method 400 illustrated in FIG. 4. At operation 412, the processing logic may determine a number of noise waveforms at an output of the second functional element. At operation 414, the processing logic may propagates at least one noise waveform from the noise waveforms at the output of the second functional element to a third functional element. At operation 416, the processing logic may determine the at least one noise waveform has reached an endpoint in the electronic design. At operation 418, the processing logic may propagate the at least one noise waveform through a channel-connected block (CCB) to check for noise failure.

At operation 420, responsive to a height of the at least one noise waveform at an output of the CCB satisfying a first defined criterion, the processing logic may identify the at least one noise waveform as an endpoint violation. In another embodiment, responsive to the height of the at least one noise waveform at the output of the CCB satisfying a second defined criterion, the processing logic may identify the at least one noise waveform as a catastrophic failure, and reset the at least one noise waveform at the one or more functional elements.

The above disclosed approach involves using the channel connected component information captured in Liberty library cell information. The maximum noise that is possible on each net is calculated as a time-domain wave shape. The calculated noise considers all significant noise sources, including for example charge-sharing noise, coupling though the interconnect, and power-supply levels. Noise can also propagate from a channel connected component input to a channel connected component output. Noise failures can also be determined by the noise stability, a type of AC noise margin analysis, of each channel connected component given the worst case noise appearing at its inputs. This involves calculating the transient sensitivity of the output noise with respect to the level of the input noise.

Figure 6:
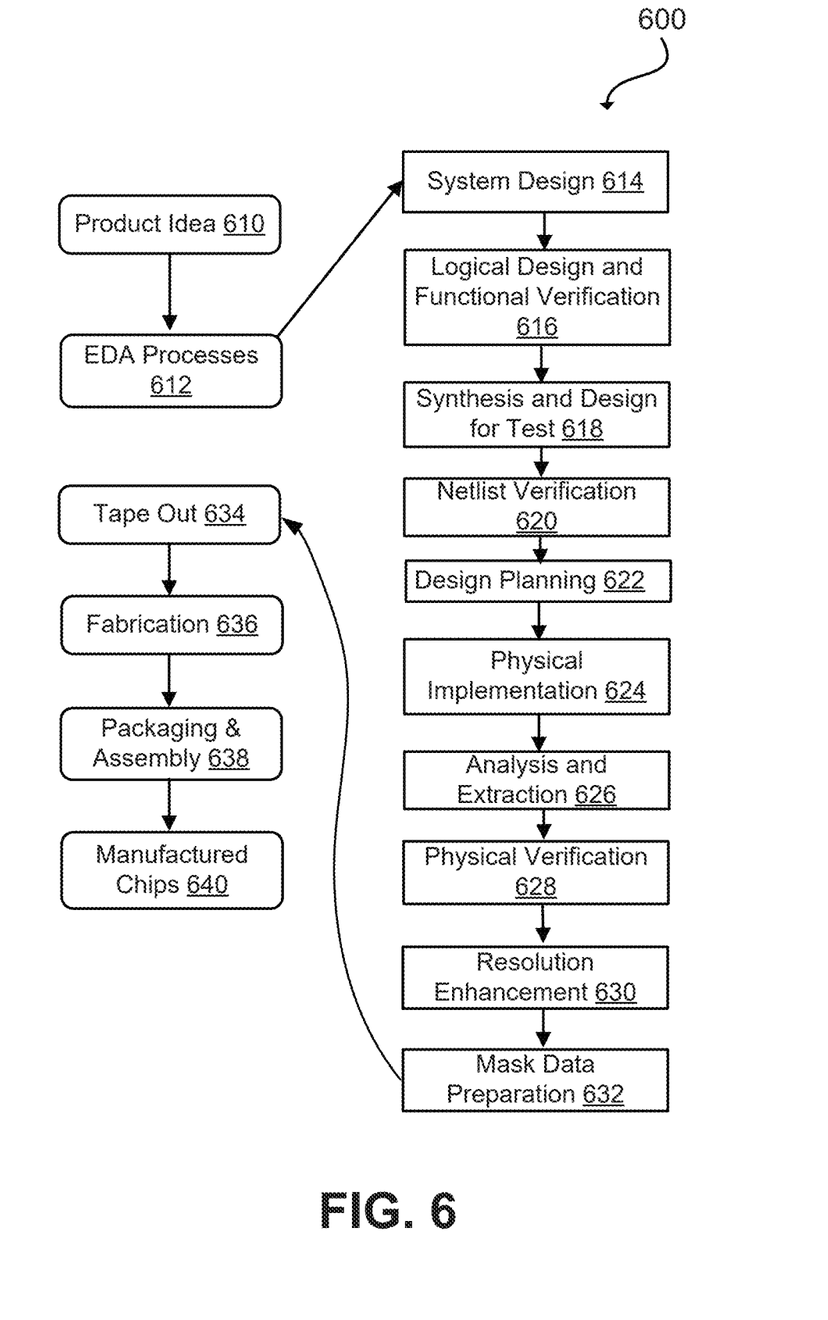
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes can start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die can be fabricated 636 and packaging and assembly processes 638 can be performed to produce the finished integrated circuit 640.

Specifications for a circuit or electronic structure may range from low-level transistor material layouts to high-level description languages. A high-level of abstraction may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which can be used for detailed descriptions of circuits with many analog components. Descriptions at each level of abstraction are enabled for use by the corresponding tools of that layer (e.g., a formal verification tool).

A design process may use a sequence depicted in FIG. 6. The processes described herein can be enabled by EDA products (or tools).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit can be specified in one or more description languages and the specification can be checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' can be used to speed up the functional verification.

During synthesis and design for test 618, HDL code can be transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist can be checked for compliance with timing constraints and for correspondence with the HDL code. During design planning 622, an overall floor plan for the integrated circuit can be constructed and analyzed for timing and top-level routing.

During layout or physical implementation 624, physical placement (positioning of circuit components such as transistors or capacitors) and routing (connection of the circuit components by multiple conductors) can occur, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and can be enabled as both physical structures and in simulations. Parameters can be specified for selected cells (based on 'standard cells') such as size and made accessible in a database for use by EDA products.

During analysis and extraction 626, which is related to the present disclosure, the circuit function can be verified at the layout level, which permits refinement of the layout design. During physical verification 628, the layout design can be checked to ensure that manufacturing constraints are correct, such as DRC constraints, electrical constraints, lithographic constraints, and that circuitry function matches the HDL design specification. During resolution enhancement 630, the geometry of the layout can be transformed to improve how the circuit design is manufactured.

During tape-out, data can be created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 7:
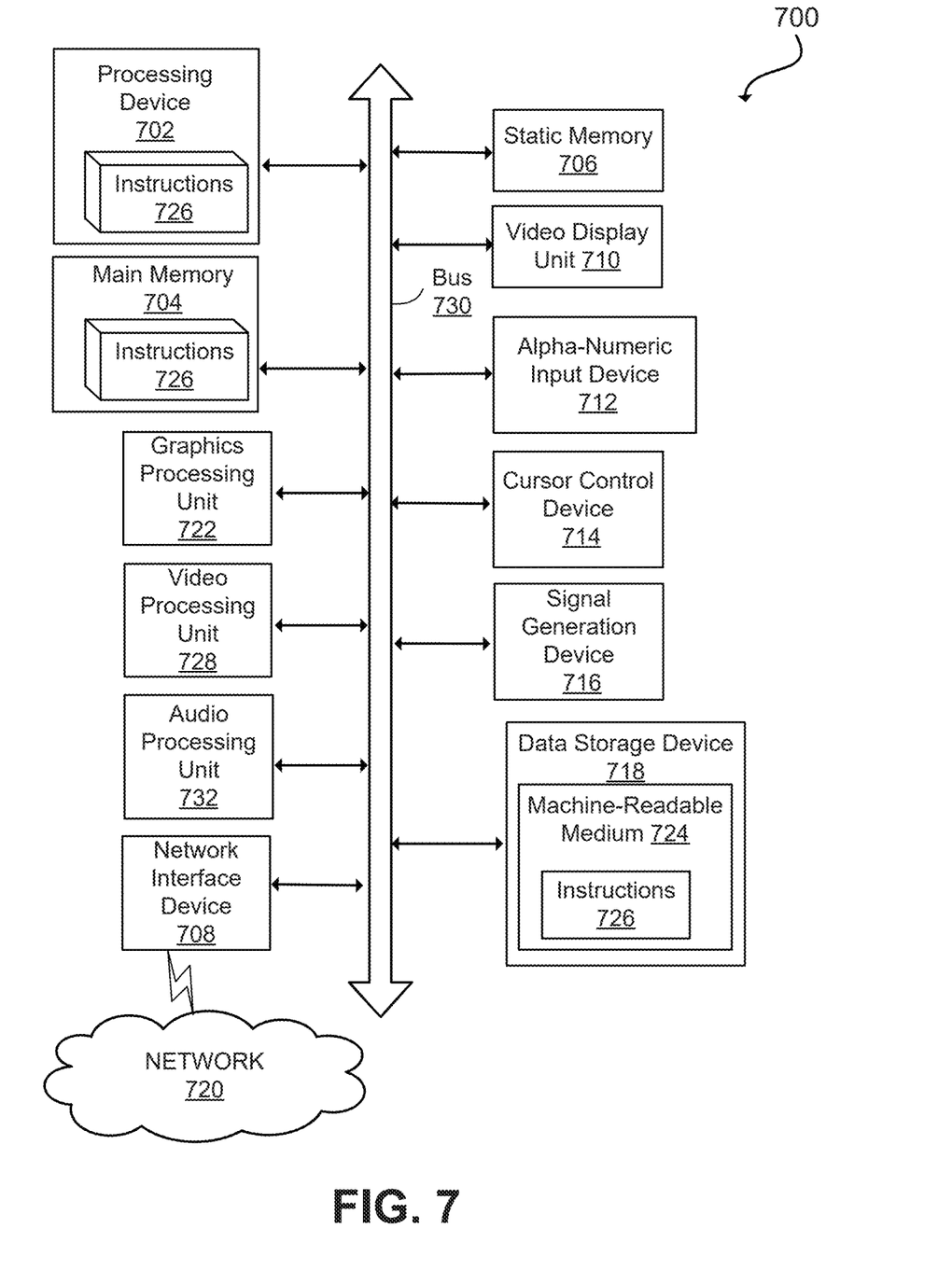
FIG. 7 depicts a diagram of an example computer system in which embodiments of the present disclosure may operate.

FIG. 7 illustrates an example machine of a computer system 700 within which a set of instructions, for causing the machine to perform any one or more of the methodologies discussed herein, including performing noise analysis in an electronic design of an integrated circuit, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one embodiment, the non-transitory computer readable medium may include instructions 726 which when executed by a processing device (e.g., processing device 702), cause the processing device to generate a digital representation of a level-shifting circuit. The level-shifting circuit may include a level shifter configured to receive a first clock signal associated with a first power level (VDDP) and generate a second clock signal associated with a second power level (VDDA). The second power level may be greater than the first power level. The level-shifting circuit may further include an input clock buffer including a first input including the second clock signal from the level shifter, and a second input coupled in parallel to the first input; the second input including the first clock signal. In one embodiment, the first power level includes a peripheral voltage and the second power level includes a bitcell array voltage. The input clock buffer may be configured to generate an output clock signal when a difference between the second power level and the first power level is above a determined threshold voltage, and generate the output clock signal when the difference between the second power level and the first power level is below the determined threshold voltage. The output clock signal may be provided as inputs to a memory periphery and a memory timer, and the memory periphery and memory timer may be coupled in parallel to the input clock buffer.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It may be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It may be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for performing noise analysis in an electronic design of an integrated circuit, the method comprising:
   accessing, by a processing device, the electronic design of the integrated circuit, the electronic design comprising a plurality of voltage domains, wherein each voltage domain comprises one or more functional elements and one or more domain voltages;
   performing a timing analysis of the electronic design and determining respective signal arrival timing windows for the one or more functional elements in the electronic design;
   generating a noise waveform at a first functional element based on the signal arrival timing windows and slews of aggressor nets of a first functional element in a first voltage domain of the plurality of voltage domains;
   determining a number of noise waveforms reaching a second functional element in a second voltage domain based on the plurality of voltage domains and the one or more domain voltages in the plurality of voltage domains; and
   propagating at least one noise waveform of the number of noise waveforms to the second functional element.

2. The method of claim 1, further comprising:
   determining a number of noise waveforms at an output of the second functional element based on signal arrival timing windows and slews of the aggressor nets of a second functional element; and
   propagating at least one noise waveform from the noise waveforms at the output of the second functional element to a third functional element.

3. The method of claim 2, further comprising:
   determining the at least one noise waveform has reached an endpoint in the electronic design;
   propagating the at least one noise waveform through a channel-connected block (CCB) to check for noise failure; and
   responsive to a height of the at least one noise waveform at an output of the CCB satisfying a first defined criterion, identifying the at least one noise waveform as an endpoint violation.

4. The method of claim 3, further comprising:
   responsive to the height of the at least one noise waveform at the output of the CCB satisfying a second defined criterion, identifying the at least one noise waveform as a catastrophic failure; and
   resetting the at least one noise waveform at the one or more functional elements.

5. The method of claim 4, further comprising:
   responsive to identifying the at least one noise waveform as the endpoint violation, modifying the electronic design of the integrated circuit, wherein modifying the electronic design comprises one or more of inserting a buffer, eliminating a parasitic, moving the first functional element farther from the second functional element, reducing a coupling capacitance, reducing a size of the first functional element, reducing a size of the second functional element, or rewiring.

6. The method of claim 5, wherein resetting of the noise on catastrophic violations is done for an individual scenario or all scenarios.

7. The method of claim 1, wherein the first functional element and the second functional element reside in the same voltage domain, or the first functional element and the second functional element reside in different voltage domains.

8. The method of claim 1, wherein the first functional element and the second functional element comprise one or more of a cell driver, a cell receiver, a flip flop, a register, a storage element, an IP module, a logic gate, a transistor, or an integrated circuit component.

9. The method of claim 1, further comprising: determining the first functional element or the second functional element is a noise injection source based on the signal arrival timing windows of the aggressors nets between the first functional element and second functional element.

10. The method of claim 1, wherein the noise computation for a stage is vectorized based on voltage domain crossing.

11. The method of claim 10, wherein the number of computations are expanded based on the number of voltage levels in self and adjacent voltage domains.

12. The method of claim 10, wherein the number of computations are merged based on circuit levels from the voltage domain crossing.

13. A non-transitory computer-readable medium storing program instructions executable by a processing device, causing the processing device to perform operations comprising:
   accessing an electronic design of an integrated circuit, the electronic design comprising a plurality of voltage domains, wherein each voltage domain comprises one or more functional elements and one or more domain voltages;
   performing a timing analysis of the electronic design and determining respective signal arrival timing windows for the one or more functional elements in the electronic design;
   generating a noise waveform at a first functional element based on the signal arrival timing windows and slews of aggressor nets of a first functional element in a first voltage domain of the plurality of voltage domains;
   determining a number of noise waveforms reaching a second functional element in a second voltage domain based on the plurality of voltage domains and the one or more domain voltages in the plurality of voltage domains; and
   propagating at least one noise waveform of the number of noise waveforms to the second functional element.

14. The non-transitory computer-readable medium of claim 13, wherein the instructions further cause the processing device to perform operations comprising:
   determining a number of noise waveforms at an output of the second functional element based on signal arrival timing windows and slews of the aggressor nets of a second functional element; and
   propagating at least one noise waveform from the noise waveforms at the output of the second functional element to a third functional element.

15. The non-transitory computer-readable medium of claim 13, wherein the instructions further cause the processing device to perform operations comprising:
   determining the first functional element or the second functional element is a noise injection source based on the signal arrival timing windows of the aggressors nets between the first functional element and second functional element.

16. The non-transitory computer readable medium of claim 13, wherein the noise computation for a stage is vectorized based on voltage domain crossing.

17. The non-transitory computer-readable medium of claim 16, wherein the number of computations are expanded based on the number of voltage levels in self and adjacent voltage domains.

18. The non-transitory computer readable medium of claim 16, wherein the number of computations are merged based on circuit levels from the voltage domain crossing.

19. The non-transitory computer readable medium of claim 13, wherein resetting of the noise on catastrophic violations is done for an individual scenario or all scenarios.

20. A system for performing noise analysis in an electronic design of an integrated circuit, the system comprising:
a processing device; and
a memory coupled to the processing device, the memory storing computer readable instructions that when executed by the processing device cause the processing device to perform operations comprising:
accessing the electronic design of the integrated circuit, the electronic design comprising a plurality of voltage domains, wherein each voltage domain comprises one or more functional elements and one or more domain voltages;
performing a timing analysis of the electronic design and determining respective signal arrival timing windows for the one or more functional elements in the electronic design;
generating a noise waveform at a first functional element based on the signal arrival timing windows and slews of aggressor nets of a first functional element in a first voltage domain of the plurality of voltage domains;
determining a number of noise waveforms reaching a second functional element in a second voltage domain based on the plurality of voltage domains and the one or more domain voltages in the plurality of voltage domains; and
propagating at least one noise waveform of the number of noise waveforms to the second functional element.

* * * * *